US009516167B2

(12) United States Patent
Pirat et al.

(10) Patent No.: US 9,516,167 B2
(45) Date of Patent: Dec. 6, 2016

(54) MEDIA CHANNEL MANAGEMENT APPARATUS FOR NETWORK COMMUNICATIONS SESSIONS

(71) Applicant: Genesys Telecommunications Laboratories, Inc., Daly City, CA (US)

(72) Inventors: Vincent Pirat, Brest (FR); Frederic Thomas, Loperhet (FR); Boris Nicolas, Gouesnou (FR); Herbert W. A. Ristock, Walnut Creek, CA (US); Philippe Rais, Walnut Creek, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 118 days.

(21) Appl. No.: 14/340,526

(22) Filed: Jul. 24, 2014

(65) Prior Publication Data

US 2016/0028891 A1    Jan. 28, 2016

(51) Int. Cl.
*H04M 1/64* (2006.01)
*H04M 3/51* (2006.01)

(52) U.S. Cl.
CPC ......... *H04M 3/5183* (2013.01); *H04M 3/5166* (2013.01)

(58) Field of Classification Search
CPC .................................................. H04M 3/5183
See application file for complete search history.

(56) References Cited

U.S. PATENT DOCUMENTS

| | | | |
|---|---|---|---|
| 6,212,178 B1 | 4/2001 | Beck et al. | |
| 6,373,836 B1 | 4/2002 | Deryugin et al. | |
| 6,628,755 B2 | 9/2003 | Shimada et al. | |
| 6,711,146 B2 | 3/2004 | Yegoshin | |
| 7,274,787 B1 | 9/2007 | Schoeneberger | |
| 7,496,640 B2 | 2/2009 | Hanhan | |
| 8,117,538 B2 | 2/2012 | Anisimov et al. | |
| 8,472,612 B1 | 6/2013 | Goringe et al. | |
| 8,731,163 B1 | 5/2014 | Bates et al. | |
| 8,781,103 B2 | 7/2014 | Baranovsky et al. | |

(Continued)

FOREIGN PATENT DOCUMENTS

| | | |
|---|---|---|
| KR | 20070023981 A | 3/2007 |
| KR | 20110070296 A | 6/2011 |
| WO | 2014093729 A1 | 6/2014 |

OTHER PUBLICATIONS

International Search Report and Written Opinion for International Application No. PCT/US2015/042106, mailing date Nov. 4, 2015, 14 pages.

(Continued)

Primary Examiner — Joseph T Phan
(74) Attorney, Agent, or Firm — Lewis Roca Rothgerber Christie LLP

(57) ABSTRACT

A system includes: a computerized appliance having a processor; and software executing on the computerized appliance from a non-transitory physical medium, the software providing: establishment of a communication session over a network between two or more end communications appliances; detection and recording of at least media channel capabilities on individual end communications appliances connected in the session; service of media channel toggle options to end communications appliances; detection of media channel toggle option selections made by users operating the end communications appliances; and implementation of the media channel toggle option or options selected for individual communications sessions.

21 Claims, 5 Drawing Sheets

(56) References Cited

U.S. PATENT DOCUMENTS

| | | |
|---|---|---|
| 2002/0055350 A1 | 5/2002 | Gupte et al. |
| 2005/0002502 A1 | 1/2005 | Cloran |
| 2006/0215634 A1 | 9/2006 | Croak et al. |
| 2006/0276196 A1 | 12/2006 | Jiang et al. |
| 2007/0203820 A1 | 8/2007 | Rashid |
| 2008/0152121 A1 | 6/2008 | Mandalia et al. |
| 2009/0307074 A1 | 12/2009 | Sharma |
| 2010/0030578 A1* | 2/2010 | Siddique ............ G06Q 10/0637 705/3 |
| 2010/0211428 A1 | 8/2010 | Duffy et al. |
| 2010/0251177 A1 | 9/2010 | Geppert et al. |
| 2010/0312885 A1 | 12/2010 | Berger |
| 2011/0009096 A1 | 1/2011 | Rotsztein et al. |
| 2011/0019812 A1 | 1/2011 | Sankaranarayanan |
| 2011/0029869 A1* | 2/2011 | McLennan ............ G06F 3/017 715/702 |
| 2011/0113143 A1 | 5/2011 | Paczkowski et al. |
| 2011/0211679 A1 | 9/2011 | Mezhibovsky et al. |
| 2012/0224681 A1 | 9/2012 | Desai et al. |
| 2012/0265695 A1 | 10/2012 | Tuchman et al. |
| 2012/0309351 A1 | 12/2012 | Dutta |
| 2012/0323997 A1 | 12/2012 | Mezhibovsky et al. |
| 2013/0022191 A1 | 1/2013 | Or-Bach et al. |
| 2013/0089007 A1 | 4/2013 | Ristock |
| 2013/0136253 A1 | 5/2013 | Liberman Ben-Ami et al. |
| 2013/0173479 A1 | 7/2013 | Paz Salgado et al. |
| 2013/0188785 A1 | 7/2013 | Zhakov |
| 2013/0215116 A1* | 8/2013 | Siddique ............ G06Q 30/0643 345/420 |
| 2013/0218947 A1 | 8/2013 | Zur et al. |
| 2013/0244632 A1 | 9/2013 | Spence et al. |
| 2013/0282844 A1* | 10/2013 | Logan .................... H04L 67/02 709/206 |
| 2014/0106718 A1 | 4/2014 | Liu et al. |
| 2014/0162611 A1 | 6/2014 | Mezhibovsky et al. |
| 2014/0164256 A1 | 6/2014 | Booij et al. |
| 2014/0171034 A1 | 6/2014 | Aleksin et al. |
| 2014/0245143 A1 | 8/2014 | Saint-Marc |
| 2014/0321634 A1 | 10/2014 | Baranovsky et al. |

OTHER PUBLICATIONS

James, Bill et al., Optimizing Customer Experiences with Mobile Applications, presentation, Nov. 15, 2010, 24 pages, Genesys Telecommunications, Laboratories, Inc.

Written Opinion and International Search Report for PCT/US2013/07438, mailed on Mar. 31, 2014, 19 pages.

* cited by examiner

MEDIA CHANNEL MANAGEMENT APPARATUS FOR NETWORK COMMUNICATIONS SESSIONS

BACKGROUND

1. Field

Embodiments of the present invention relate to the field of telecommunications

2. Description of the Related Art

Telecommunications systems, communications capabilities generic to contact center systems and the users that interact with them are continually being developed by adding flexibility in methods of communication. Much development has been focused toward communications with clients who patronize commercial entities that employ centralized or distributed communications services. Many such communications services are operated as contact centers employing a variety of separate and dedicated media channels that are available for communications between patrons and automated systems or Customer Service Representatives. In addition to traditional telephony voice services, multi-party conferencing, text messaging, email, chat, Web co-browsing, message posting, video, and collaborative multi-media applications have been developed to expand the media options for meeting communications requirements.

In many communications applications, multiple media channels are available for accommodating technical capabilities and preferences of clients. Choice of media channels may also be driven by nature/contents of conversation, e.g. long URL can be better transferred via text rather than voice. A problem exists with such applications in that they may be platform dependent and users may have the same application installed on communications end appliances or devices in order to participate. In other applications that use multiple media channels for communications, each channel is dedicated to the single media type used for communications. The media type may be chosen at the beginning of a session and, at least in some circumstance, it may not be reasonable for participants to switch to other media channels during the same session without perhaps losing context of the session.

Some applications have been developed that may allow users to communicate through a specialized communications portal or by leveraging a specialized application that may allow both voice and texting and or co-browsing capabilities in parallel. However, the actual session architecture still employs separate dedicated media channels and the user is dependent on the application or portal, which aggregates the channels through a single interface enabled by the portal or by tools in the application.

Therefore, a system that solves the problems stated above by enabling a communications session with media channel, and in some cases, communications device flexibility in a platform and application independent manner is desired.

SUMMARY

Embodiments of the present invention relate to methods and apparatus for enabling and managing communications sessions with flexibility relative to selection of active media channels, and in some embodiments session devices during the active session.

According to one embodiment of the present invention, there is provided a system including: a computerized appliance having a processor; and software executing on the computerized appliance from a non-transitory physical medium, the software providing: establishment of a communication session over a network between two or more end communications appliances; detection and recording of at least media channel capabilities on individual end communications appliances connected in the session; service of media channel toggle options to end communications appliances; detection of media channel toggle option selections made by users operating the end communications appliances; and implementation of the media channel toggle option or options selected for individual communications sessions.

The network may be a packet-switched network supporting a plurality of media channels.

Media channels may include one or more of voice, text messaging, email, chat, video conferencing, web collaboration, which may include co-browsing, and social media.

One or more of the communications appliances in an established communications session may be a wirelessly-operated mobile communications appliance.

The wirelessly-operated mobile communications appliance may be a cellular telephone or a pad device enabled for more than one communication channel.

The system may further include detection of dynamic constraints of communication appliances, including actual channel active and signal coverage and strength, in addition to media channel capabilities.

The media channel toggle options are served or otherwise communicated to end communications appliances in a form of a menu of interactive selections and or graphics.

The media channel toggle options may be served or otherwise communicated to end communications appliances by an interactive voice response (IVR) system in synthesized or recorded voice prompts.

The software may further provide capture of context communicated over a previous media channel used for the communications session and delivery of that context to end communications appliances over a selected media channel.

The software may further provide notification of media channel availability for selected media channels.

The media toggle options may include an option for continuing the communications session on a different communications end appliance, while either continuing or discontinuing session on an original appliance.

End communications appliance operating system, platform, and contact information are detected and recorded in addition to media channel capabilities.

The software may further provide routing instruction to a router to transfer a session to another end communications appliance based on a detected busy state, or other unavailability state on a connected communications appliance of a selected media channel.

A media channel toggle option may include an option for changing the media channel for just one communications end appliance in session.

A wireless, close-proximity capability may be used to capture operating platform, media channel capability, and contact data of an end communications appliance that will replace another in session.

According to another embodiment of the present invention, there is provided a method including: establishing a communication session over a network between two or more end communications appliances; detecting and recording of at least media channel capabilities on individual end communications appliances connected in the session;

serving or otherwise communicating media channel toggle options to end communications appliances; detecting media channel toggle option selections made by users operating end communications appliances; and implementing the media channel toggle option or options selected for individual communications sessions.

The network may be a packet-switched network supporting a plurality of media channels.

Media channels may include voice, text messaging, email, chat, and video conferencing.

The method may further comprise: capturing and delivering to end communications appliances over a selected media channel of context communicated over a previous media channel used for the communications session.

The method may further comprise: notifying communications end devices of media channel availability for selected media channels.

DETAILED DESCRIPTION

Embodiments of the present invention provide a unique system and method for switching media channels during a communications session established over a network, the sessions involving two or more end-point communications appliances. Embodiments of the present invention will be described in enabling detail using the following examples, which may describe more than one relevant implementation or embodiment falling within the scope of the present invention.

Figure 1:
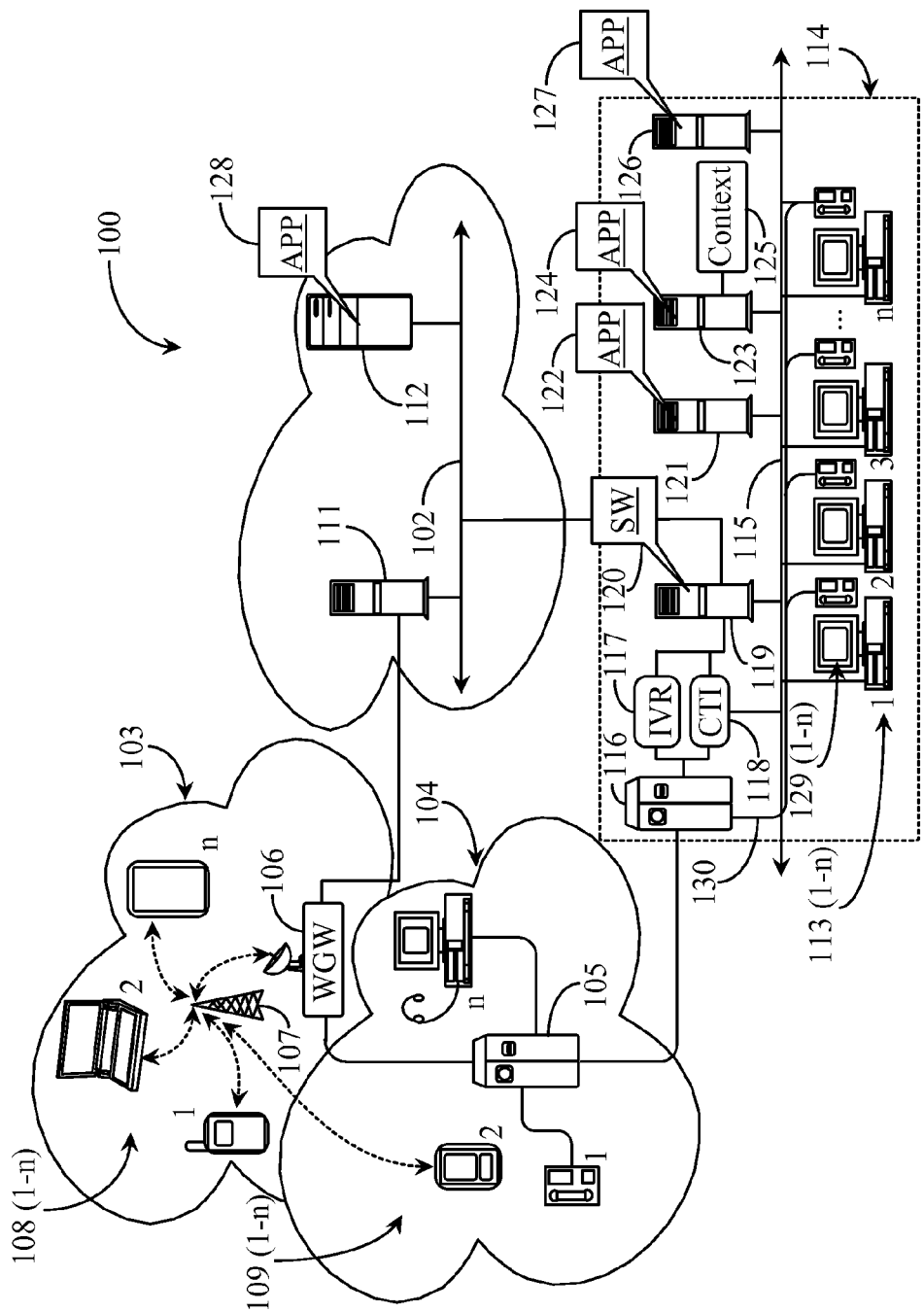
FIG. 1 is an architectural overview of a communications network supporting platform independent media channel flexibility during an active communications session according to an embodiment of the present invention.

FIG. 1 is an architectural overview of communications network 100 supporting platform independent media channel flexibility during an active communications session according to an embodiment of the present invention. Communications network 100 may include a wireless carrier network 103. Wireless carrier network 103 may provide, according to a variety of embodiments, communications and network-access support for clients illustrated herein as clients 108 (1-n). Wireless network 103 may be a wireless cellular network, a digital phone network, or a satellite-based network without departing from the spirit and scope of the present invention. Network 103 may include a cell tower 107 and a wireless gateway (WGW) 106 equipped with a communications transceiver.

Clients 108 (1-n) represent wireless communications appliances also referred to herein as mobile devices. In the present embodiment, the mobile devices include a cellular telephone, a laptop computer, and an i-Pad type device.

Clients 108 (1-n) may access a wide area network (WAN) referenced herein by a network backbone 102. Network backbone 102 may be supportive of a corporate WAN, a campus network, an Intranet, a municipal area network (MAN) or some other suitable WAN. Network backbone 102 may be an Internet backbone in one embodiment. In the present embodiment, backbone 102 may support the Internet network and may include all of the lines equipment and access points that make up the Internet as a whole. In another embodiment of the present invention, backbone 102 may support an automatic transaction network without departing from the spirit and scope of the present invention.

Communications network 100 may include a telephone network 104. Telephone network 104 may be a public switch telephone network (PSTN) segment or some other suitable public or private telephone network, without departing from the spirit and scope of the present invention. Public Land Mobile Networks (PLMN) may also be included. Network 104 provides communications services and access to Internet 102 for clients 109 (1-n) through wireless gateway 106. Clients 109 (1-n) represent wired and wireless communications appliances including, for example, a telephone a smart phone or android device (mobile) and a desktop computer running a telephony application.

Communications network 100 may include a call center 114. Call center 114 may represent any enterprise or third-party contracted by an enterprise that manages enterprise communications such as sales, service, and technical help for clients or customers of the enterprise. Call center 114 may represent a state-of-art center capable of fielding calls and handling transactions over a variety of media channels including voice, voice over Internet protocol (VoIP), email, text, chat, co-browsing, and other media channels. In some circumstances social media may be considered a dedicated channel. For example, a contact center might capture some customer conversation on social media, initiate contact via social media, and transfer the interaction to voice or chat outside of the social media. Call center 114 may include a local area network (LAN) 115. LAN 115 is adapted for Internet communications and internal communications.

Call center 114 may include a telephone switch 116. Telephone switch 116 may be an automated call distributor (ACD), a private branch exchange (PBX), or some other suitable type of telephone switch without departing from the spirit and scope of the present invention. Switch 116 may represent a central office switch adapted to receive incoming calls from clients and to distribute the calls to human and to automated resources within the call center. Switch 116 may be enhanced by computer telephony integration (CTI), leveraging a CTI processor connected to the switch by a CTI link. Switch 116 may also have access to interactive voice services (IVR) such as an IVR unit 117 connected to the switch and to CTI functionality.

Switch 116 in call center 114 has a telephony link connection to a telephone switch 105 in PSTN segment 104. Callers from network 104 may call into call center 114 and be intercepted at switch 116 for both automated and live services available within the center. Clients 108 (1-n) may also access switch 116 through wireless gateway 106 and switch 105 in PSTN network 104. Switch 116 represents the last hop in call path for incoming calls before routing to service personnel or to automated systems.

LAN 115 may support one or more hubs or routers like a connected communications router 119. Router 119 may be adapted to provide routing instructions for interactions waiting at switch 116. Router 119 may also be adapted to route requests incoming through Internet 102. Router 119 may include a processor, a data repository, and memory containing all of the data and software for enabling routing of interactions of various media types. Router 119 may have a connection to Internet 102 for providing Internet access to call center personnel and call center access from the Internet 102.

Internet 102 may include a router 111. Router 111 represents any Internet router for routing data and Internet-supported communications, which are data communications. Internet backbone 102 may support a web server 112. Web server 112 may include a processor, a data repository, and memory containing all of the software and instruction to function as a web server. Web server 112 may be owned or leased by the enterprise connected to call center 114 or it may be maintained by a third party web page hosting service. Web server 112 may host a web site for the enterprise where clients may visit and transact with the enterprise.

LAN 115 may support a number of communications workstations 113 (1-n). Workstations 113 (1-n) may be operated by live call center agents or other personnel, such as knowledge workers and supervisors, authorized to interact with clients of the call center, which may include non-voice interactions. Communications workstations 113 (1-n) may be characterized in this embodiment as a LAN-connected personal computer (PC) and a switch-connected telephone. Telephones at workstations 113 (1-n) may be connected to switch 116 by internal telephone wiring 130. Telephones at workstations 113 (1-n) may in another embodiment, be connected to LAN 115 or to the PC in the workstation. In one embodiment the telephones may be PBX phones. Each PC at workstations 113 (1-n) has a desktop communications/sales application 129 (1-n) executed and displayed on the PC monitor. The desktop application may be adapted to provide agent status and notifications, access to pertinent client and product data, desktop routing capabilities, agent chat and messaging, among other things.

LAN 115 may support an application server 121. Application server 121 may include a processor, a data repository, and memory containing all of the software and instruction to enable functionality as an application server. Application server 121 may host several different applications such as an application 122 adapted as a call center communications application to which the desktop applications 129 (1-n) may be client applications.

LAN 115 may support a context server 123. Context server 123 may include a processor, a data repository, and memory containing all of the software and instruction required to enable the functionality of a context server. Context server 123 may have access to a data repository 125 adapted to contain session context that is captured and recorded for later use by the system of embodiments of the present invention. Repository 125 may contain text, recorded voice, recorded video with audio, and graphics generic to session context recorded from one or more communications sessions held within the call center domain.

Context server 123 may host an application 124 adapted to capture and record context during active communications sessions held within the call center. Application 124 may include one or more components for converting voice to text and text to synthesized speech. Application 124 may serve captured and recorded context upon request from a user or from another node on LAN 115. LAN 115 may also support a chat server 126. Chat server 126 may include a processor, a data repository, and a memory containing all of the software and instruction enabling functionality as a chat server. Chat server 126 may be maintained by the enterprise on LAN 115 or it may be hosted by a third party on Internet 102 without departing from the spirit and scope of the present invention. In other embodiments there may be other servers supported by LAN 115 such as email or messaging servers, statistical servers, client information servers, and the like.

Router 119 may host software (SW) 120. SW 120 is adapted, among other tasks, to detect and record end appliance or device communications media capabilities in order to determine if those appliances or devices might practice media channel switching during an active communications session. SW 120 may also be adapted to connect users to alternate media channels based on user preferences and to maintain primary media channel pathways while an alternate media channel is being utilized. SW 120 may be a part of an enterprise interaction routing application adding functionality for session participants to be able to switch to an alternate media channel during interaction with the call center.

In use of embodiments of the present invention, a user operating a network connected appliance like appliance 108 (n) may access call center 114, for example, via a voice call to switch 116 through WGW 106 and switch 105. Once the call request reaches switch 116, IVR 117 may intercept and interact with the caller. In this embodiment, router 119 may be notified of the call attempt at the point of IVR interception. Router 119 aided by SW 120 might determine, before or during IVR prompting and before routing, that the connected appliance is capable of supporting more than one media channel such as both voice and text communication channels. If the appliance does not support more than one media channel, the appliance would not be considered for a service offering user directed switching of media channels.

During interaction with the caller, the IVR may serve a special prompt enabling the caller to select via a voice or touch tone menu an alternate media channel to switch or toggle to during the session. For example, assuming a voice menu, the caller may say "switch to text". SW 120 may then establish a text media channel such as short message service (SMS) or, provided the end appliance has Internet connection open, a web-based textual/graphical channel that may be used to continue the IVR session with the caller. In this case, the voice-driven IVR menu might be replaced by the web-based IVR menu with the same options and interactive selection capabilities. The voice channel may be blocked while the web-based channel is open and active. Moreover, a web-based IVR option for switching back to the voice channel may be pushed to display on the callers appliance enabling the caller to switch or toggle back to the voice channel any time during the web-based textual session.

In the above embodiment, the router may maintain the call legs of the voice channel should the caller want to switch quickly back to voice during the session. At some point during IVR interaction the caller may elect to be routed to a live agent, for example. Router 119 aided by SW 120 may route the interaction using the voice channel to a live agent such as one operating at workstation 113 (2), for example. When the agent takes the call, the session may continue in the voice channel. During the conversation with the agent, the system may send an asynchronous message like an interactive text message containing an option to switch or toggle to another available media channel like agent chat, for example.

The caller in session with an agent at workstation 113 (2) may respond by selecting a chat option displayed on screen in a text message or in some other notification supported by the session and appliance. If the caller selects the chat option, a chat request is routed directly to the same agent currently in voice session with the caller. The router may broker the setup of the chat session for the caller and the agent at chat server 126 aided by application 127. The router may then transfer the session to chat while blocking the voice channel. In this embodiment, router 119 may notify context server 123 aided by application 124. Application 124 may be adapted to record session context for all media channels storing the context in repository 125. When the chat session becomes active, the context server may then serve content that might have been missed during the transition between channels. In one embodiment, the last minute of voice interaction is converted to text and delivered at the beginning of the chat session for display in the chat window or box displayed on the visual interfaces of the appliances used by the agent and by the caller.

For every instance of toggling between available media channels, the context server synchronizes with each transaction so that context is not lost during the transition between channels. Application 122 on application server 121, application 124 on context server 123, application 127 on chat server 126, and application 128 on web server 112 may all include application extensions of SW 120 on router 119. The system may be distributed to a number of cooperating nodes in one embodiment, or it may be contained in one dedicated node connected to the network and cooperating with the call handling system of the enterprise or call center.

In one embodiment, a caller operating a telephone like telephone 109 (1) may call into center 114 switch 116 through local switch 105 in the PSTN network. In a standard application, the caller would not be able to switch media channels as the phone does not have any other media capabilities. However, in this embodiment the caller also has control of a smart phone 109 (2). In one embodiment, smart phone 109 (2) may be pre-registered with a service hosted by the call center. In this embodiment, the caller may, during a session with IVR 117 or during a live call with an agent, select an option for switching media channels to a channel supported on smart phone 109 (2) but not on telephone 109 (1).

In this case, router 119 may determine that the caller is known to have smart phone 109 (2) pre-registered so the caller may be given the option of switching media channels to available channels supported by smart phone 109 (2). In one embodiment, geographic positioning satellite (GPS) data and network connection status for the smart phone might be gathered and analyzed before giving the user the option of switching media channel and device for the session. Router 119 aided by SW 120 may notify IVR 117 to serve, via voice menu, a special option that may enable the user to switch from voice to text, for example, on smart phone 109 (2). When the user agrees and makes the selection, the voice call is blocked or otherwise put on hold. The text session may then open up automatically on the smart phone as the result of an outbound contact to the smart phone from the call center.

The context server may maintain the relationship between the session channels, for example, voice blocked on telephone and text active on smart phone. In one embodiment, the user might select an option from the text menu to switch back to voice. This may result in voice channel activation on the pre-registered smart phone as opposed to reactivation of the voice path on the standard telephone the user first employed to contact the center. In this embodiment, the voice channel maintained between the call center IVR and the telephone may be terminated.

It is important to note herein that should the user decide to stay on the telephone voice channel while in session with the IVR, the option to switch media channels and devices may be extended to other end routing points such as a voice mail system, other automated services, and to a live connection with a human operator such as a call center agent. An option that may be provided in a voice or text menu may include as many media channels that are available from the call center and supported by the target appliance operated by the user. In the case of a voice only device with no display, the user may switch to another device that supports one or more of the additional channels. Standard options reflecting call center channels that are available may appear grayed out on a user's appliance display if the appliance does not support the channel or the channel is currently unavailable at the call center, for example, busy with a long wait time.

In another embodiment, router 119 aided by SW 120 might set up an alternate media channel for a client that has requested the option, for example, switching from live voice to chat while in session with a live agent, and then determine that the same agent the client was speaking with is currently busy on chat. In some circumstances, the switchover to chat might be routed to another agent that is available in chat. Similar to having party flexibility at the contact-center side, one might also add additional parties at the customer side, for example, a customer could request having his friend conference in. In this embodiment, context server 123 aided by application 124 might serve previous session context to the new agent so that the agent will quickly understand what has transpired between the first agent and the client at the start or just before the start of the chat session. Also in this embodiment, the previous voice channel might be terminated with the first agent.

Figure 2:
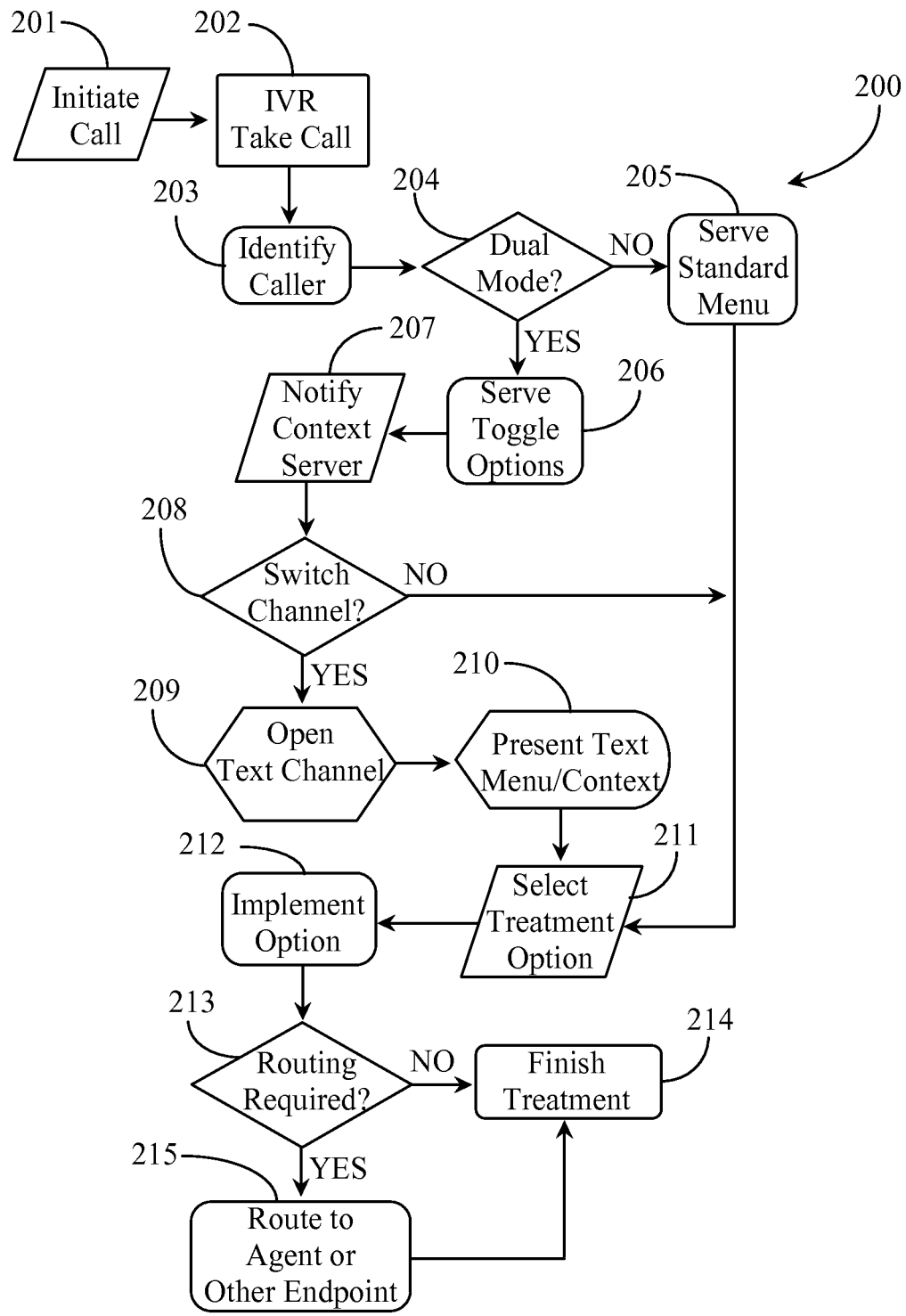
FIG. 2 is a process flow chart depicting acts for implementing media channel flexibility during a communications session according to an embodiment of the present invention.

FIG. 2 is a process flow chart 200 depicting acts for implementing media channel flexibility during a communications session. In act 201, a caller may initiate or place a voice call into a call in center such as center 114 shown in FIG. 1. In act 202, the IVR may intercept the call registered at the switch. During the IVR session, the caller may be identified in act 203. In this act, the system may determine the caller's identification, contact information, and at least the media channel capability of the device or appliance the caller used to phone into the center.

In act 204, the system might determine whether the appliance the caller is using in session is capable of utilizing more than one media channel. If it is determined in act 204 that the caller is using a standard plain old telephone service (POTS) telephone supporting only a voice channel, the process might move to act 205 for standard service of the typical IVR routing menu. If the system determines that the appliance the caller is using in session has more than one media channel such as a dual mode voice and text capable appliance, the IVR may serve a special menu that informs the caller of an opportunity to toggle or switch channels in session in act 206.

In act 207, the system may notify a context server such as context server 123 shown in FIG. 1 of the possible scenario involving the client initiating toggling to another media channel. The notification may include the caller's identity and the current session identification (ID). In one embodiment, the context server may not be notified until the caller actually initiates a media channel switch. It is also important to note herein that there may be more than one media channel option for the caller to select. In act 208, the caller may make a determination of whether to switch to another media channel after receiving the option menu. In one embodiment, the option to switch to an alternate media channel remains open throughout the IVR session, and the caller may be periodically prompted or may be informed that the caller may use a special button to toggle modes between voice and text at any time, or that the caller may say a command such as "switch me" to initiate the change.

If the caller does not respond to the option for switching media channel in act 208, the process may skip to act 211 where the caller might select a standard treatment option from the IVR menu. If the caller decides to have the session conducted on an alternate media channel in act 208, the router may set up the media channel for communication in act 209. In one embodiment, the context server is notified at this point with a notification that may include the caller's identity, the previous session ID, and the current session ID given to the alternate media channel selected by the client.

In act 210, the context server may serve content recorded from the previous channel into the session using the selected media channel. For example, a small snippet of context representing context over a fixed period of time, for example, 1 minute, might be taken off of the end of the previous session conducted over the first channel (e.g., voice) and converted to text for insertion into the session using the alternate media channel (e.g., text). The same process may be repeated in reverse or where the first channel is text and the selected option is voice.

In this particular embodiment, the caller has elected to change to another media channel (e.g., text) while interacting with the IVR. Therefore, in step 210 the context server coordinates with the IVR system to deliver further IVR menu equivalents in text, in addition to any context that might be included. In act 211, the caller may select a treatment option presented over the text channel. In one embodiment, this might be considered an IVR chat channel where the IVR menu appears in display and the client may select options and add content in some cases through the text channel.

In step 212, the treatment option selected in act 211 may be implemented by the system, for example, "connect me to a live agent." In act 213, the routing service may determine if routing is required. If the system determines no routing is required in act 213, this implies that the caller may be using automated attendant services only and does not need routing services to an agent or any other endpoints. If the system determines that no routing is required in act 213, the process moves to act 214 where IVR treatment is finished. If the system determines that routing is required in act 213 to meet the caller's needs, the current session may be routed to an agent or to another end point device or appliance. In act 215, the system routes the current session to an agent or to another selected end-point system such as any automated interaction system. It is noted herein that toggling to alternate media channels might occur more than once during a session between an IVR and the caller, or not at all during the session. This may depend on the use case. That is, if the IVR menu is pushed as a navigation graph, then the customer would likely navigate directly to the target selection rather than going through intermediate steps and switching media; however, there might be also valid use cases for the latter. It is also noted herein that the option of toggling media channels may be open throughout a session between a caller and the call center where the actual toggling might occur before or after routing the call. Media channel(s) selection might also be enforced. For example, a customer might dial voice call but as result might get a text channel.

In one embodiment, if a caller has switched to text during an IVR session and then selected "route me to a live agent" from a text option, the routed call might be a voice call by default wherein the caller may have the option of switching to text or chat while in voice session with the agent. In one embodiment, the IVR "button" adapted to activate the toggle menu may be maintained in an active state over the voice channel regardless of where the caller is connected in the call center. In this embodiment, the selection by the caller of the option provides first notification that a switch is in process.

Figure 3:
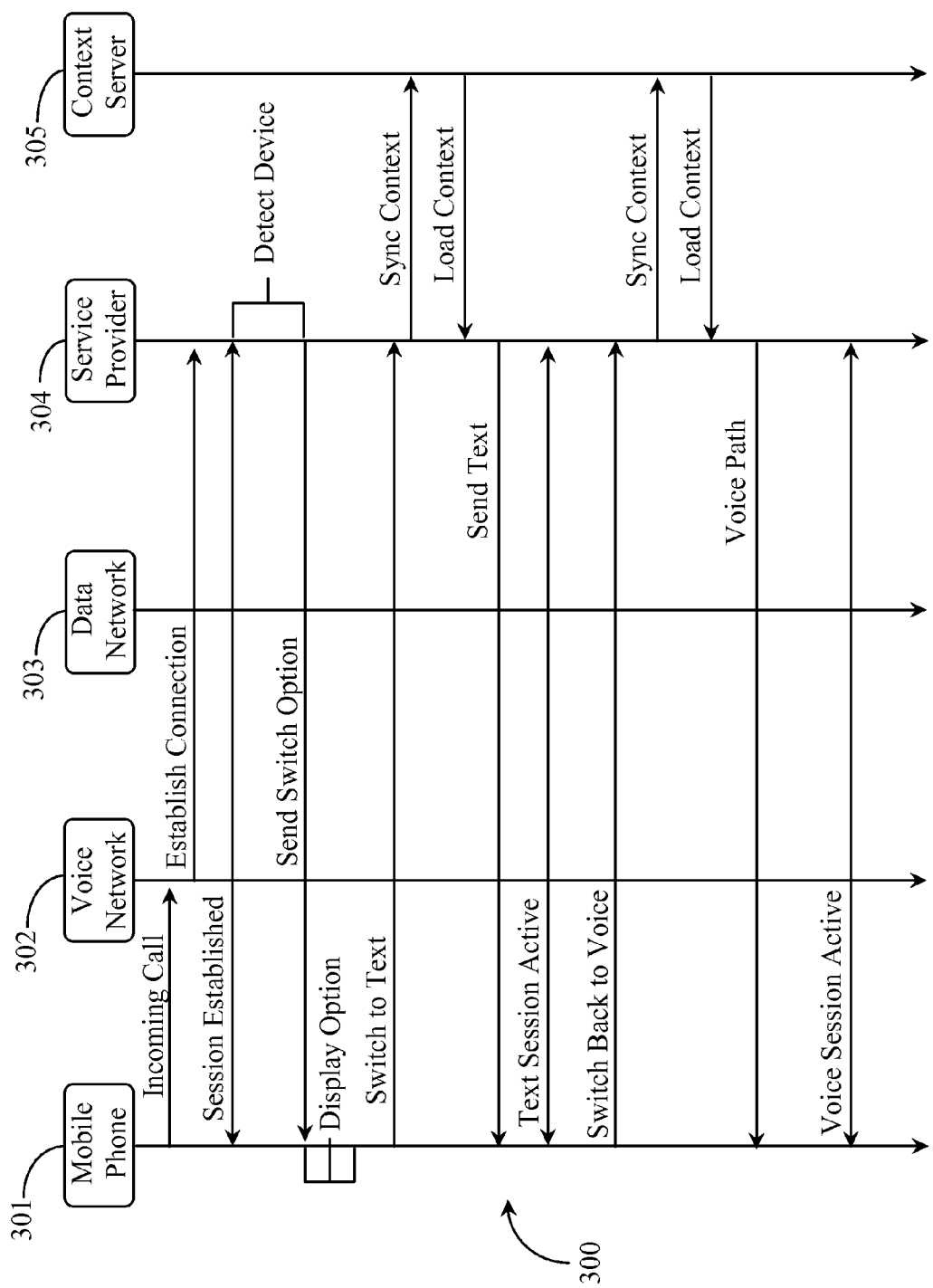
FIG. 3 is a sequence diagram depicting an interaction sequence between a service provider and other service components involved in enablement of media channel flexibility according to an embodiment of the present invention.

FIG. 3 is a sequence diagram 300 depicting an interaction sequence between a service provider and other service components involved in enablement of media channel flexibility according to an embodiment of the present invention. Diagram 300 includes some basic communications components or entities that might come into play during practice of embodiments of the present invention. A mobile phone 301 may be analogous to device 108 (1) shown in FIG. 1 and represents the caller. A voice network 302 represents implementation of a voice channel. A data network 303 represents implementation of a text channel. A service provider 304 represents an entity that may host the service of embodiments of the present invention, such as call center 114 shown in FIG. 1. Context server 305 represents a context service analogous to server 123 shown in FIG. 1.

In this simple use case implementation, a mobile caller places an incoming call into the call center. The incoming call may be intercepted at a telephone switch and a connection may be established between the caller and the service provider (e.g., component). The component might be an IVR, another automated system, or a live agent. Once the current session is established between the service provider and the client, the system may detect the capabilities of the mobile phone relative to media channel capabilities. Likewise, the caller may be identified, and the session ID established. Assuming that the mobile phone supports more than one media channel such as voice and text, the system serves a switch or toggle option to the mobile phone. This option might be a voice prompt if the caller is currently connected over the voice network. In one embodiment, the first media channel is text-based and the option involves toggling to voice or another media channel.

In one embodiment, the option to switch media channels is live over the course of the session. The option received at the mobile phone may be an asynchronous message sent to the caller while the caller is speaking on the phone to the IVR system or to a live agent. Once the caller decides to initiate a switch or toggle function from the first media channel to another media channel, in this case, text, the service provider entity such as the router or some other relevant system component notifies the context server to sync and load text content to send to the mobile device. In one embodiment, a caller may elect to switch to text when in a live voice session with an agent where the caller receives text converted from agent spoken content and the agent receives synthesized voice generated from the caller's typed words. A voice to text/text to voice system may accomplish this in near to real time.

Once the text session is active, the voice channel may be blocked but left open in case the caller is switching to text temporarily. While the text session is active, a switch to or toggle button is displayed on or otherwise made available on the caller's device that enables the caller to switch back to voice any time during the session. The context server syncs content and reloads context, in this case, text converted to synthesized voice and sent to the caller over the reactivated voice channel. The caller may toggle back and forth from voice to text and back to voice during communication. In one embodiment, a limit to the number of times a user may toggle between media channels is enforced to prevent unnecessary use of the feature.

Figure 4:
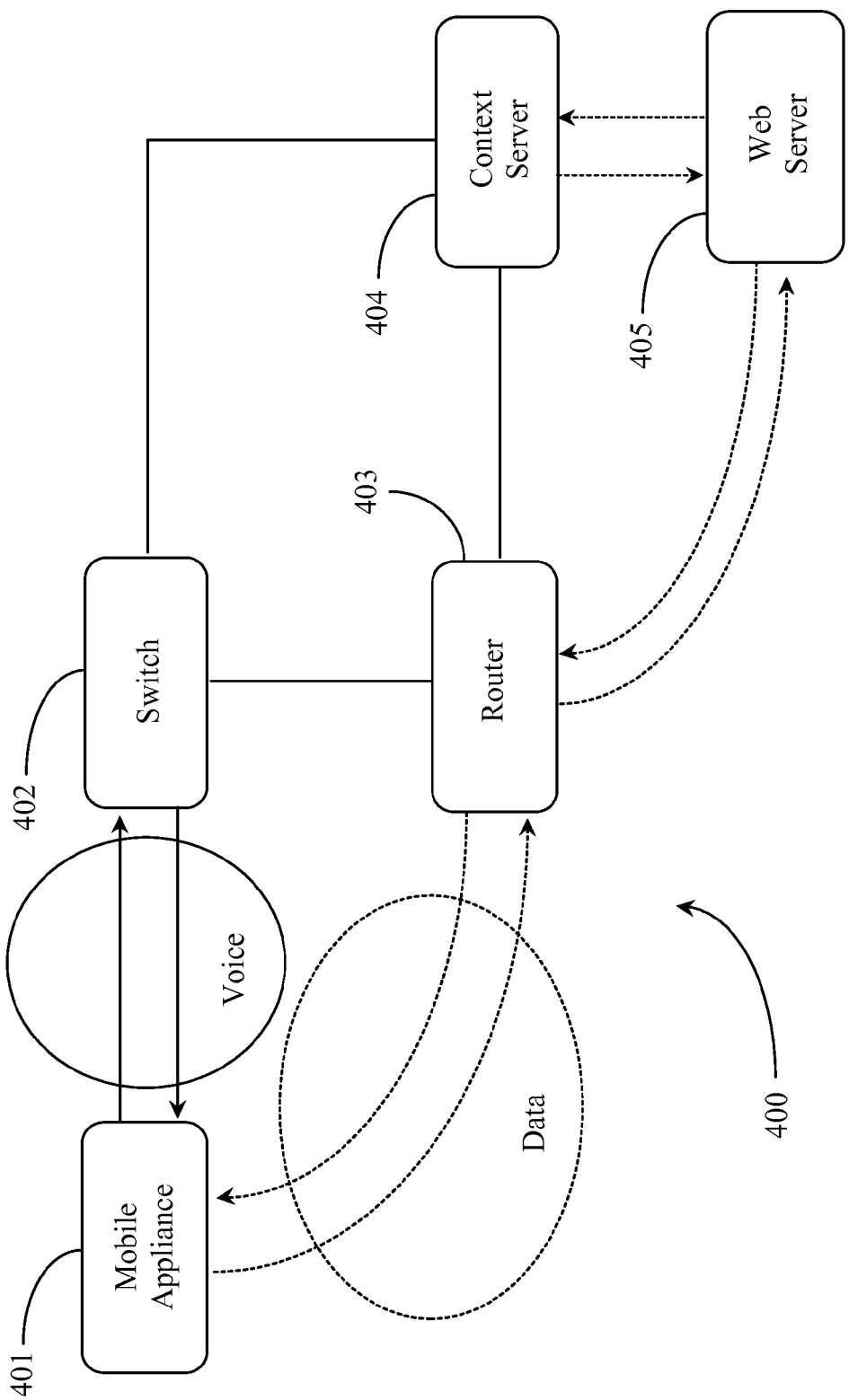
FIG. 4 is a block diagram depicting components involved in enablement of media channel flexibility in a web-assisted implementation according to an embodiment of the present invention.

FIG. 4 is a block diagram 400 depicting basic components involved in enablement of media channel flexibility in a web-assisted embodiment. Diagram 400 includes a block architecture including a mobile appliance 401 such as a smart phone and a telephone switch 402 representing a switch controlled by the service provider or an entity contracted by the service provider. In this simple embodiment, the caller operating appliance 401 places a voice call that registers at switch 402 before routing. IVR functionality may be leveraged to interact with the caller to determine caller identity and intent.

Router 403 represents an interaction routing system capable of setting up all of the available media channels. Router 403 may be called upon to detect at least the media capabilities and contact information for the caller's smart phone. In one embodiment, the phone is preregistered with a service enabling the toggling function. The router may determine the type of device used to call in as well as the operating platform and media capabilities of the device. In this embodiment, the router is responsible for effecting the channel switching and notifying a context server 404. In this embodiment, a web server 405, analogous to web server 112 shown in FIG. 1, is employed to service at least one of the text channels.

Router 403 may notify context server 404 whenever a switch from one channel to another channel has been implemented. In this embodiment, the context server notifies a web server 405 running an application such as application 128 shown in FIG. 1. The web server may serve chat or any text or graphics deemed appropriate context for the channel the caller has elected. Web server 405 may push text and graphics to router 403, which in turn may send it to the caller's mobile phone through a data network such as the Internet. In this simple architecture, the caller may stay on the voice path with an IVR and have data pushed to the mobile device for display while the IVR channel is still open. In another embodiment, the IVR session may be blocked while the data channel between the caller and web server 405 remains active and where the router may function as a proxy server.

In this embodiment, the switch, router, and context server may share a network link. In this embodiment, the context server may maintain an Internet connection with a web site or sites hosted on the web server in order to capture and record session context. It is noted herein that other architectural embodiments are possible depending upon the available channels and mobile device capabilities. In one embodiment, the equipment might be provided by different parties. For example, the switch and router may belong to the call center while the context server and web server may be maintained by a third-party that is providing the service. In another embodiment, all of the components with the exception of the caller's device are connected to a same LAN or WAN having Internet network properties.

Figure 5:
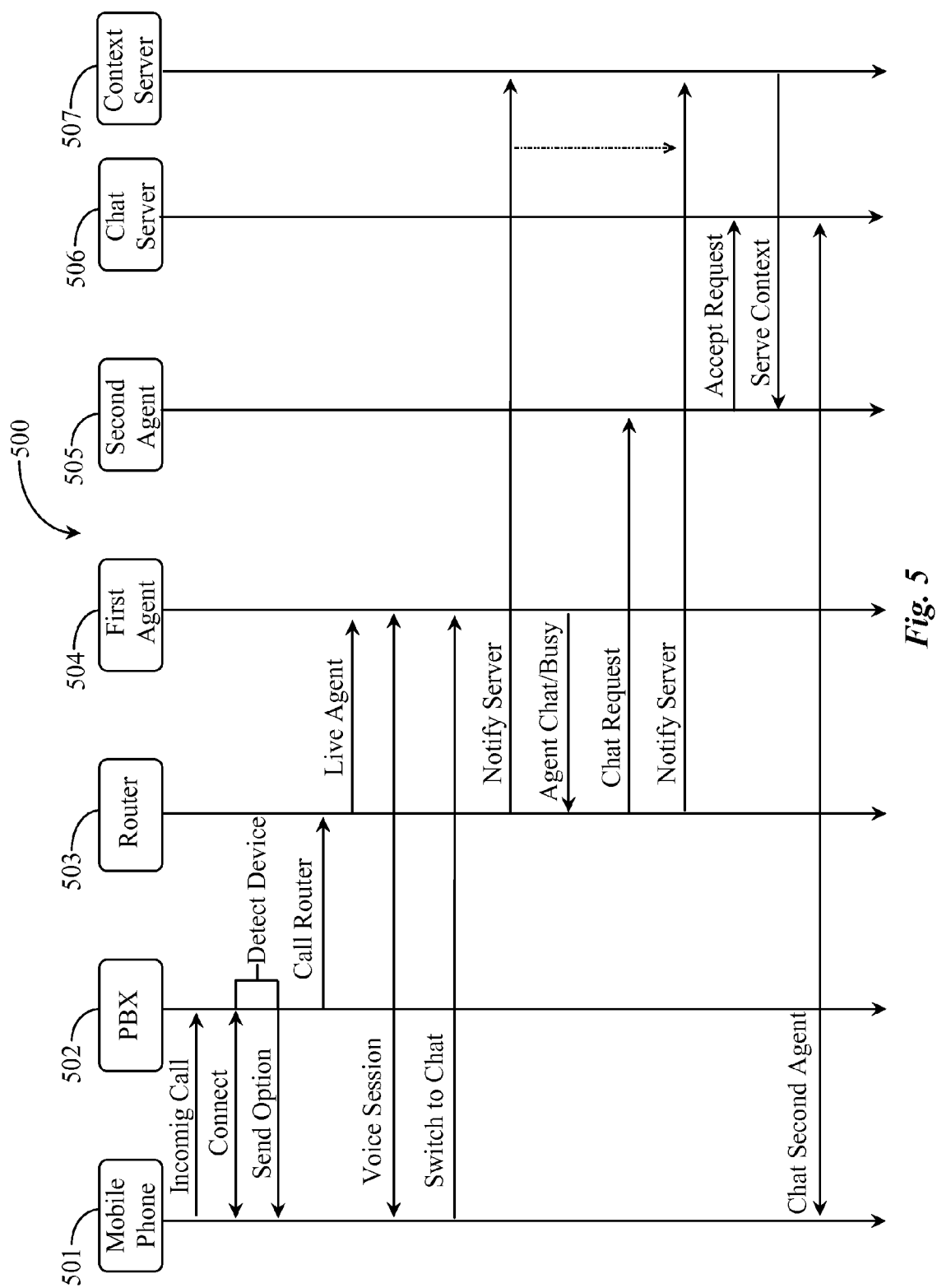
FIG. 5 is a sequence diagram depicting an interaction sequence involving more than one live agent and other service components involved in enablement of media channel flexibility with agent level routing assistance according to an embodiment of the present invention.

FIG. 5 is a sequence diagram 500 depicting an interaction sequence involving more than one live agent and other service components involved in enablement of media channel flexibility with agent level routing assistance. A caller's appliance 501 may be a mobile phone capable of voice communications and network chat capabilities. In this embodiment, a caller operating mobile appliance 501 calls into a call center or other telecommunications system capable of routing interactions and is intercepted at switch 502. In this embodiment, an IVR may intercept the call and interact with the caller using a voice channel. During interaction, the IVR may detect the device capabilities regarding media channel capabilities. The device may be preregistered or not preregistered. If the device is not preregistered, the IVR may query the device or survey the device owner to determine the device capabilities.

Assuming the device has at least voice and chat capabilities, the IVR may deliver the option enabling the caller to switch media channels while connected to the IVR. In this embodiment, the caller is routed to a live agent before exercising the option to switch to a different media channel. Router 503 is called to route the call to a live agent 504. Router 503 establishes a voice session with an available first agent 504. In this embodiment, the caller decides to switch to chat using the option provided in the IVR session. The option may be assigned to a button on the device that the caller may press while in session to switch channels. In one embodiment, the caller may simply say "switch to chat" the enunciation detected by a voice monitoring system integrated with the IVR or built into a call monitoring system responsible for recording session context.

In this embodiment, the decision to switch to chat is detected by router 503. Router 503 then notifies a context server 507 that the caller is switching to chat. The router may provide the caller identity, the device capabilities, and the current voice session ID as well as the agent ID the caller is in session with. The context server may convert a small portion of the voice content to text to send to the pending chat session as a precursor to inform the chat participants of previous context including the subject of the session and the intent of the caller.

The router may by default attempt to set up a chat session between the caller and the same agent (504) that was in the voice session. However, in this embodiment the agent the caller was talking with is busy also on chat and cannot take another chat session at the time of the decision. In this case, the router may route the chat session request to a second agent 505 that is available for chat. The router may then notify context server 507 of the routing decision and may provide the identification of the next agent that will be accepting the session.

In this embodiment, the second agent accepts the chat session brokered by chat server 506. The context including information from the previous voice session may be delivered into the chat session and made visible to the agent before the agent chats with the caller. This provides the agent with critical information that otherwise would not be readily available to the agent such as the caller ID, caller intent or goal, subject of the previous session and some amount of previous session content to get the agent on track with the process begun under the voice channel. The caller then joins the chat and the active chat session is established between the caller and the second agent. In an alternate embodiment, the chat option might be temporarily grayed out or marked not available until the agent (504) becomes available on that channel.

In one embodiment, a transcript of a certain snippet of the voice conversation between the caller and the first agent is converted to a chat dialog that may appear before the actual chat begins. In this way both participants may stay on track with the process that was being pursued in the voice conversation. Should the caller determine to switch back to voice while in the chat session, the context server may synthesize a portion of the chat dialog into voice and may serve that to both the agent and the caller in the event the caller switches back to voice with the first or second agent. For other media channels, the same general process may be observed with some slight alterations due to media channel type and network factors such as introduction of web servers, chat servers, messaging servers, or other media channel providers or hosts. In one embodiment for text channels, encryption may be provided automatically for private information such as for social security or credit card data.

In one embodiment, switching to a different media channel for a session may be automated and based on some trigger event like detection of low bandwidth, low battery, movement of the mobile appliance, such as driving or walking (e.g., text channel to voice only channel). Other trigger events that might automatically cause a session to be switched to another media channel might include service coverage boundary cross over. In one embodiment, communications devices might also be switched during a session in order to accommodate a media channel not supported on one device or when a first device is fixed and the caller wants to move but keep the session open. An example of this might be when a user is at a retail establishment and on a stationary enterprise computing system chatting with an agent. The user may want to move away from the computer toward a certain area of the store but may want to keep the agent session open. In this case, the media channel may be switched to voice on the user's smart phone. In such a situation, the system may detect through a GPS service that the user has a smart phone that is capable of carrying on the session away from the retail terminal. In one embodiment, the user may leverage near field communications (NFC) to transfer device information the agent through the retail terminal.

In one embodiment, a user having two devices capable of NFC communication may transfer a session from device to device as long as one of the devices is currently in session. In this embodiment, the user may be in session with a smart phone but wants to switch a video session from the smart phone having a much smaller display to a notebook having a much larger display. The user may elect to switch devices for a same media channel and bring the notebook within range of NFC so that the system may discover the contact information and capabilities of the notebook with reference to successful transfer of the session from the smart phone to the notebook. The user may also transfer the session back to the smart phone after the video is watched by again ringing the devices within NFC range of one another, indicating the desire to switch back to the original device.

In one embodiment, a telephone conference may be in session between agents operating tethered PBX phones or LAN devices that are stationary. Some participants may wish to take a walk while participating or may have to move away from their fixed location devices for a period of time. These agents may then indicate a desire to switch devices by NFC contact between their mobile devices and their fixed location devices or if their devices are preregistered with the system they might select an option to "switch to mobile" and then may walk away with their mobiles. The system preserves session context and establishes conference legs to the mobile devices and may deliver any context that may have been missed during the transition. Such transitions may take only a few seconds depending upon the latency inherent with the communications system outbound service. The original fixed location devices may be muted while the user is in session with the mobile device. However, the user may switch back to the fixed location device from the mobile device when the user returns to the fixed location.

In another embodiment, taking security concerns into account, a media channel may be available that ensures that a conversation between two parties stays within the boundaries of a country or other geographic region (e.g., city, state), an enterprise, or any other physical limitation. Parties engaged in an interaction might be using a media channel that is not enabled for such security limitation, and may choose to switch to the more secure media channel, without closing the session. In another situation, the parties may wish to switch to a channel that has stronger encryption than the current channel, perhaps as a result of deciding to discuss a topic that may require a higher level of security.

It will be apparent to one with skill in the art that the media channel management system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

From the foregoing, it will be appreciated that various embodiments of the present invention have been described herein for purposes of illustration, and that various modifications may be made without departing form the scope and spirit of the present invention. Accordingly, the various embodiments disclosed herein are not intended to be limiting, with the true scope and spirit being indicated by the following claims, and equivalents thereof.

What is claimed is:

1. A system comprising:
   a processor; and
   a memory coupled to the processor, wherein the memory has stored thereon instructions that, when executed by the processor, cause the processor to:
   establish a communication session over a network, in a first media channel, between a first communication device associated with a user and a second communication device associated with a contact center;
   identify whether or not a third communication device associated with the user is configured to communicate in a second media channel different from the first media channel;
   transmit a signal to the first or third communication devices to provide a media channel toggle option for toggling the communication session to the second media channel on the third communication device;
   receive a selection of the media channel toggle option from the first or third communication devices; and
   in response to receiving the selection of the media channel toggle option, initiate a communication session between the third communication device and the second communication device in the second media channel.

2. The system of claim 1, wherein the network is a packet-switched network supporting a plurality of media channels.

3. The system of claim 1, wherein media channels include one or more of voice, text messaging, email, chat, video conferencing, web collaboration, which may include co-browsing, and social media.

4. The system of claim 1, wherein the third communication device is a wirelessly-operated mobile communications appliance.

5. The system of claim 4, wherein the wirelessly-operated mobile communications appliance is a cellular telephone or a pad device enabled for more than one communication channel.

6. The system of claim 1, further comprising detection of dynamic constraints of communication appliances, including actual channel active and signal coverage and strength, in addition to media channel capabilities.

7. The system of claim 1, wherein the media channel toggle options are served or otherwise communicated to end communications appliances in a form of a menu of interactive selections and or graphics.

8. The system of claim 1, wherein the media channel toggle options are served or otherwise communicated to end communications appliances by an interactive voice response (IVR) system in synthesized or recorded voice prompts.

9. The system of claim 1, wherein the instructions further cause the processor to capture context communicated over a previous media channel used for the communications session and delivery of that context to the third communication device over the second media channel.

10. The system of claim 1, wherein the instructions further cause the processor to identify media channel availability for the second media channel.

11. The system of claim 1, wherein the media toggle options include an option for continuing the communications session on a different communications end appliance, while either continuing or discontinuing session on an original appliance.

12. The system of claim 1, wherein end communications appliance operating system, platform, and contact information are detected and recorded in addition to media channel capabilities.

13. The system of claim 10, wherein the instructions further cause the processor to transmit routing instruction to a router to transfer a session to another end communications appliance based on a detected busy state, or other unavailability state on a connected communications appliance of a selected media channel.

14. The system of claim 1, wherein a media channel toggle option includes an option for changing the media channel for just one communications end appliance in session.

15. The system of claim 11, wherein a wireless, close-proximity capability is used to capture operating platform, media channel capability, and contact data of an end communications appliance that will replace another in session.

16. A method comprising:
establishing, by a processor, a communication session over a network, in a first media channel, between a first communication device associated with a user and a second communication device associated with a contact center;
identifying, by the processor, whether or not a third communication device associated with the user is configured to communicate in a second media channel different from the first media channel;
transmitting, by the processor, a signal to the first or third communication devices to provide a media channel toggle option for toggling the communication session to the second media channel on the third communication device;
receiving, by the processor, a selection of the media channel toggle option from the first or third communication devices; and
in response to receiving the selection of the media channel toggle option, initiate a communication session between the third communication device and the second communication device in the second media channel.

17. The method of claim 16, wherein the network is a packet-switched network supporting a plurality of media channels.

18. The method of claim 16, wherein media channels include voice, text messaging, email, chat, and video conferencing.

19. The method of claim 16, further comprising:
capturing and delivering to end communications appliances over a selected media channel of context communicated over a previous media channel used for the communications session.

20. The method of claim 16, further comprising:
notifying communications end devices of media channel availability for selected media channels.

21. The system of claim 1, wherein the instructions further cause the processor to transmit the signal to the first or third communication devices to provide the media channel toggle option for toggling the communication session to the second media channel on the third communication device based at least partially on at least one of geographic position or network connection status of the third communication device.

* * * * *